Patented Aug. 17, 1926.

1,596,545

UNITED STATES PATENT OFFICE.

WINTHROP STANLEY LAWRENCE, OF BROOKLYN, NEW YORK, ASSIGNOR TO KAUMA-GRAPH COMPANY, OF NEW YORK, N. Y., A CORPORATION OF NEW YORK.

PROTECTIVE OR MARKING COMPOSITION.

No Drawing.   Application filed June 4, 1925.  Serial No. 34,988.

My invention relates to a new and improved protective composition for protecting fabrics and other articles from the actions of dyes, inks and other marking or coloring agents.

One of the objects of my invention is to provide a fusible protective composition for said purposes.

Another object of my invention is to provide a protective composition which shall be of the transfer ink type so that the said composition can be applied upon a base made of paper or the like to form any required design or marking, and the said design or marking can thereafter be transferred to the fabric or other article, so as to protect it from the action of the coloring agent, and form what may be called a "resist" design.

Another object of my invention is to provide a protective composition to be used in the process of dyeing a fabric, so that the said composition will either destroy the dyestuff at the points to be protected, or it will so protect the fabric that it will not allow the fibres thereof to contact with the dyestuff.

Another object of this invention is to provide a protective composition embodying ingredients which are infusible or partially infusible, to protect the fibre which is being acted upon by the dyestuff or other coloring or marking agent, and to prevent the penetration of the protective composition into the interior of the fabric. This causes the outside strands of the fibre of the fabric to be coated so that resist designs of very light colors can be used in connection with dark backgrounds.

Another object of my invention is to provide a partially fusible protective composition which can be partially fused until it is thin enough to serve as a printing agent, the melting range of the said composition being so broad that the composition will flow very slowly when acted upon by an ordinary heated iron, so that the said composition can be released from the paper base in a solid mass. This property is very valuable, in order to prevent the action of dyestuffs and also for securing decorative effects in light colors on very dark backgrounds.

Compositions of the type before mentioned can also be used to mark articles having hard surfaces so that the composition penetrates only to a very slight extent.

Other objects of my invention will be set forth in the following description, it being understood that the above general statement of the objects of my invention is intended to generally explain the same and not to limit it in any manner.

One composition which has been found valuable for the above mentioned purposes is made as follows:—

A hundred grams of acid butyl tartrate are heated with 30 grams of cellulose acetate (which is a sufficiently infusible substance) until a liquid mass is obtained. This is believed to be a colloidal solution or suspension of the cellulose acetate in the acid butyl tartrate and it is a very gummy and rubberlike liquid into which 10 parts of neutral paracumarone resin (such as "Cumar") and 10 parts of Venice turpentine are stirred. The resulting composition solidifies to form a very flexible solid ink which can be applied to a great many different materials, since its range of melting is very broad. If the fabric or article marked by means of this ink is washed in the ordinary alkaline washing fluid, the acid butyl tartrate is removed by the action of the alkaline washing fluid, leaving the cellulose acetate and the other ingredients before mentioned upon the fibre of the material.

Other substances which protect the fibre of the fabric or the like from the action of marking agents such as gum argols, gutta percha, chicle substitutes, sulphur, rubber, etc. may be used instead of the cellulose derivative above mentioned. Other acid substances such as malic acid, stearic acid, phenols, etc. may be used instead of the acid butyl tartrate before mentioned, and substances of a non-acid nature but which are soluble in washing fluids may also be used as equivalents for the acid butyl tartrate, so that the infusible or partially infusible substances together with suitable pigments which may be incorporated in the composition, remain precipitated in or on the article. Any suitable coloring agents or pigments of any color may be employed in the above mentioned composition.

In the practical working example above given, cellulose nitrate could be substituted for the cellulose acetate and this could be used together with acid butyl tartrate and tri-phenyl phosphate to make a composition of the kind desired.

Another useful composition can be made by combining 10 parts by weight of a gum argol with 65 parts of chicle substitutes, 50 parts of stearic acid and 10 parts of "Cumar". The gum argols and chicle substitutes become very gummy when they are heated and they do not easily liquify at the temperatures to which transfers are ordinarily heated so that a composition of this type produces a very gummy transfer ink which does not flow into the fibres of a fabric. It is undesirable to allow the protective composition to penetrate a fabric too deeply because then the color or pigment which has been added to the protective composition becomes either invisible or loses in color value.

Sulphur can be added to any protective composition to prevent a fabric from taking up a dyestuff at the point to which the protective composition has been applied. For example, sulphur would prevent the dyeing action of indigo.

A composition which has been found very useful in preventing the action of dyes, as well as for decorating dark colored goods with light colored designs or markings can be made as follows:—

200 parts (by weight) of "Cumar" are melted and combined with 150 parts of processed rapeseed oil, that is, oil which has been thickened by blowing air through it. Then 70 parts of rubber latex are stirred into this molten mixture at as low a temperature as possible and when the ingredients have been thoroughly intermixed, the mass is heated to about 150° C. This drives off the water and ammonia which held the rubber in the latex suspension, and causes the rubber to be distributed in a jelly-like condition throughout the resin and the oil, thus giving a very uniform and a very gummy composition which is very flexible and has a very broad melting range.

A distributing agent such as Turkey red oil can be utilized for the latex, but this is not necessary.

For making the color of dark backgrounds, coloring agents such as vermilion, various bronze powders and lithopone have been found useful.

The compositions made according to the above mentioned formula may be applied in the molten or semi-molten condition to a base made of paper or any equivalent material so as to form a transfer marking of any kind. The heat transfers thus formed can be handled and shaped like any other transfer of this type. To impress the marking upon the fabric or other article, it is merely necessary to apply the transfer to the fabric or the like, the marking being caused to contact with the said fabric or article, and to then press the transfer with a hot iron in the usual manner.

After the marking has thus been formed, the article is subjected to the action of dyes or other coloring agents. Transfers of this type may be utilized for forming identifying markings on cloth, furs or other articles which are subjected to the action of coloring agents.

I have described a preferred embodiment of my invention, but it is clear that numerous changes and omissions could be made without departing from its spirit.

Thus, while I have designated the before mentioned compositions as "protective" compositions, it is obvious that they are also marking compositions in that they act directly to form impressions or markings upon pieces of fabric and various other articles. Hence, my invention includes the use of the said compositions to resist the action of other marking agents and it also covers the use of the said compositions as direct marking agents.

Whenever I refer in the claims to any of the substances previously mentioned, this is intended to include within the scope of my patent the equivalent substances which may be mentioned in the description herein, and in addition, all substances having equivalent properties.

I claim:—

1. A non-liquid protective or marking composition containing cellulose acetate and a vehicle therefor, the said composition being adapted to form a marking on a paper base which is releasable from said base under the action of heat.

2. A non-liquid protective or marking composition containing cellulose acetate and acid butyl tartrate, the said composition being adapted to form a marking on a paper base which is releasable from said base under the action of heat.

In testimony whereof I affix my signature.

WINTHROP STANLEY LAWRENCE.